(12) United States Patent
Abotabl et al.

(10) Patent No.: US 12,483,999 B2
(45) Date of Patent: Nov. 25, 2025

(54) JOINT ANTENNA ADAPTATION IN ENERGY SAVING NETWORKS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Hung Dinh Ly, San Diego, CA (US); Yu Zhang, San Diego, CA (US); Yongjun Kwak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 17/936,245

(22) Filed: Sep. 28, 2022

(65) Prior Publication Data

US 2024/0107466 A1    Mar. 28, 2024

(51) Int. Cl.
| | |
|---|---|
| *H04W 52/42* | (2009.01) |
| *H04B 7/0413* | (2017.01) |
| *H04B 7/0426* | (2017.01) |

(52) U.S. Cl.
CPC .......... *H04W 52/42* (2013.01); *H04B 7/0413* (2013.01); *H04B 7/0426* (2013.01)

(58) Field of Classification Search
CPC .... H04W 52/42; H04B 7/0413; H04B 7/0426
See application file for complete search history.

(56) References Cited

U.S. PATENT DOCUMENTS

2020/0100178 A1* 3/2020 Kim ................ H04W 76/10
2020/0314748 A1* 10/2020 Kim ................ H04W 74/006
(Continued)

FOREIGN PATENT DOCUMENTS

WO    2021041833 A1    3/2021

OTHER PUBLICATIONS

CMCC: "Discussion on Dynamic Adaption of Power Saving States", 3GPP TSG RAN WG1 #96bis, R1-1904739, 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 2, 2019, 3 Pages, XP051707300, section 2.2.
(Continued)

*Primary Examiner* — Junpeng Chen
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive, from a network node, information that indicates a periodic sequence of network energy saving (NES) states that are each associated with an antenna configuration of the network node. The UE may receive, from the network node during a current time period, one or more downlink transmissions using a maximum quantity of multiple input multiple output (MIMO) layers associated with an active NES state that is identified for a current time period based at least in part on the periodic sequence of NES states. Additionally or alternatively, the UE may transmit, to the network node during the current time period, one or more sounding reference signal (SRS) transmissions using an SRS antenna sounding configuration associated with the active NES state for the current time period. Numerous other aspects are provided.

28 Claims, 9 Drawing Sheets

(56) References Cited

U.S. PATENT DOCUMENTS

| | | | | |
|---|---|---|---|---|
| 2021/0352580 A1* | 11/2021 | Zhou | ................. | H04W 52/0209 |
| 2022/0174592 A1 | 6/2022 | Zhang et al. | | |
| 2022/0182942 A1* | 6/2022 | Guo | ................. | H04W 52/0235 |
| 2022/0232478 A1* | 7/2022 | Huang | ................ | H04W 52/028 |
| 2022/0303899 A1* | 9/2022 | Ma | .................... | H04W 52/0209 |
| 2022/0369225 A1* | 11/2022 | Iyer | ....................... | H04L 5/0053 |
| 2023/0046439 A1* | 2/2023 | Li | ..................... | H04W 52/0235 |

OTHER PUBLICATIONS

International Search Report and Written Opinion—PCT/US2023/071351—ISA/EPO—Nov. 20, 2023.

* cited by examiner

JOINT ANTENNA ADAPTATION IN ENERGY SAVING NETWORKS

FIELD OF THE DISCLOSURE

Aspects of the present disclosure generally relate to wireless communication and specifically, to techniques and apparatuses associated with joint antenna adaptation in energy saving networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

For various reasons, including climate change mitigation, environmental sustainability, and network cost reduction, network energy saving and/or network energy efficiency measures are expected to have increased importance in wireless network operations. For example, although NR generally offers a significant energy efficiency improvement per gigabyte over previous generations (for example, LTE), new NR use cases and/or the adoption of millimeter wave frequencies may require more network sites, more network antennas, larger bandwidths, and/or more frequency bands, which could potentially lead to more efficient wireless networks that nonetheless have higher energy requirements and/or cause more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity). The largest proportion of energy consumption and/or energy costs are associated with a radio access network (RAN), which accounts for about half of the energy consumption in a wireless network, with data centers and fiber transport accounting for smaller shares. Accordingly, measures to increase network energy savings and/or improve network energy efficiency are important factors that may drive adoption and/or expansion of wireless networks.

One way to increase energy efficiency in a RAN may be to use dynamic antenna adaptation in a network node that communicates using massive MIMO technology, which tends to consume significant power. For example, in an LTE network, a network node that supports massive MIMO technology may communicate using a baseband unit (BBU) that processes baseband signals and communicates with a core network through a physical interface and a remote radio unit (RRU) that performs transmit and receive radio frequency (RF) functions. In an LTE network, the per-cell power consumption (for example, in watts) is slightly larger for the RRU compared to the BBU, and the per-cell power consumption does not vary significantly with cell load. In an NR network, however, a network node that supports massive MIMO technology may communicate using a BBU and an active antenna unit (AAU) that consumes significantly more power (for example, because NR operates at a higher data rate and/or a higher bandwidth than LTE). Accordingly, a network node that supports massive MIMO communication may enable dynamic antenna adaptation based on a current and/or predicted cell load in order to improve energy efficiency. For example, when the cell load is high, the network node may turn all (or most) antenna panels, sub-panels, and/or ports on to increase capacity, and the network node may turn off one or more antenna panels, sub-panels, and/or ports to reduce energy consumption when the cell load is low. However, in cases where the network node supports dynamic antenna adaptation (for example, to use energy more efficiently depending on cell load or other factors), the change in antenna configuration parameters may necessitate adaptation to an antenna configuration that a served UE uses to receive downlink signals from and/or transmit uplink signals to the network node.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the UE to receive, from a network node, information that indicates a periodic sequence of network energy saving (NES) states, each NES state in the periodic sequence of NES states associated with an antenna configuration of the network node. The processor-readable code, when executed by the at least one processor, may be configured to cause the UE to receive, from the network node during a current time period, one or more downlink transmissions using a maximum quantity of multiple input multiple output (MIMO) layers associated with an active NES state for the current time period, the active NES state identified based at least in part on the periodic sequence of NES states.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to receive, from a network node, information that indicates a periodic sequence of NES states, each NES state in the periodic sequence of NES states associated with an antenna configuration of the network node. The processor-readable code, when executed by the at least one processor, may be configured to cause the UE to transmit, to the network node during a current time period, one or more sounding reference signal (SRS) transmissions using an SRS antenna sounding configuration associated with an active NES state for the current time period, the active NES state identified based at least in part on the periodic sequence of NES states.

Some aspects described herein relate to a method of wireless communication performed by a UE. The method may include receiving, from a network node, information that indicates a periodic sequence of NES states, each NES state in the periodic sequence of NES states associated with an antenna configuration of the network node. The method may include receiving, from the network node during a current time period, one or more downlink transmissions using a maximum quantity of MIMO layers associated with an active NES state for the current time period, the active NES state identified based at least in part on the periodic sequence of NES states.

Some aspects described herein relate to a method of wireless communication performed by a UE. The method may include receiving, from a network node, information that indicates a periodic sequence of NES states, each NES state in the periodic sequence of NES states associated with an antenna configuration of the network node. The method may include transmitting, to the network node during a current time period, one or more SRS transmissions using an SRS antenna sounding configuration associated with an active NES state for the current time period, the active NES state identified based at least in part on the periodic sequence of NES states.

Some aspects described herein relate to a non-transitory computer-readable medium that stores a set of instructions for wireless communication by a UE. The set of instructions, when executed by one or more processors of the UE, may cause the UE to receive, from a network node, information that indicates a periodic sequence of NES states, each NES state in the periodic sequence of NES states associated with an antenna configuration of the network node. The set of instructions, when executed by one or more processors of the UE, may cause the UE to receive, from the network node during a current time period, one or more downlink transmissions using a maximum quantity of MIMO layers associated with an active NES state for the current time period, the active NES state identified based at least in part on the periodic sequence of NES states.

Some aspects described herein relate to a non-transitory computer-readable medium that stores a set of instructions for wireless communication. The set of instructions, when executed by one or more processors of a UE, may cause the UE to receive, from a network node, information that indicates a periodic sequence of NES states, each NES state in the periodic sequence of NES states associated with an antenna configuration of the network node. The set of instructions, when executed by one or more processors of the UE, may cause the UE to transmit, to the network node during a current time period, one or more SRS transmissions using an SRS antenna sounding configuration associated with an active NES state for the current time period, the active NES state identified based at least in part on the periodic sequence of NES states.

Some aspects described herein relate to an apparatus for wireless communication. The apparatus may include means for receiving, from a network node, information that indicates a periodic sequence of NES states, each NES state in the periodic sequence of NES states associated with an antenna configuration of the network node. The apparatus may include means for receiving, from the network node during a current time period, one or more downlink transmissions using a maximum quantity of MIMO layers associated with an active NES state for the current time period, the active NES state identified based at least in part on the periodic sequence of NES states.

Some aspects described herein relate to an apparatus for wireless communication. The apparatus may include means for receiving, from a network node, information that indicates a periodic sequence of NES states, each NES state in the periodic sequence of NES states associated with an antenna configuration of the network node. The apparatus may include means for transmitting, to the network node during a current time period, one or more SRS transmissions using an SRS antenna sounding configuration associated with an active NES state for the current time period, the active NES state identified based at least in part on the periodic sequence of NES states.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
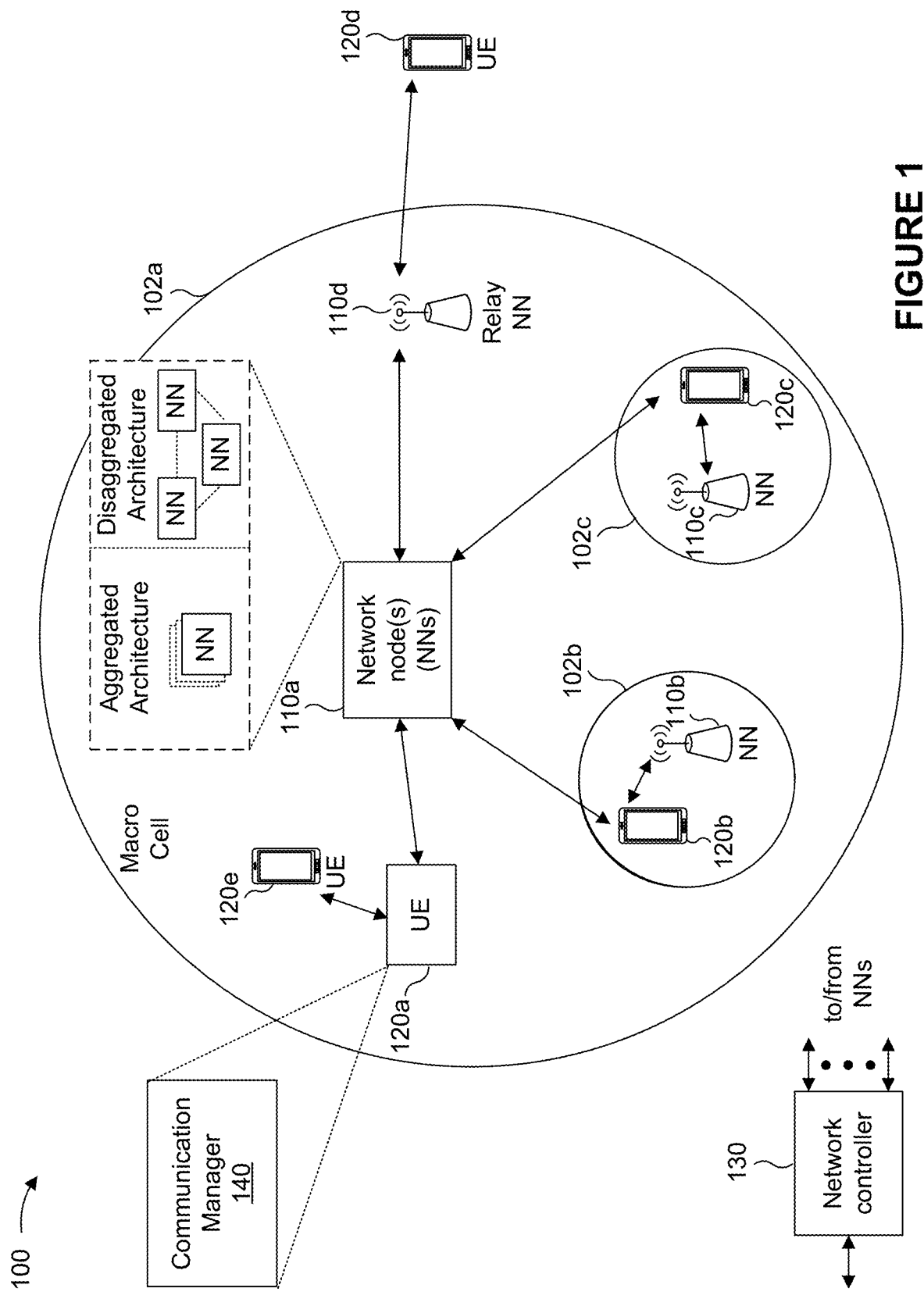
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to enabling joint antenna adaptation in energy saving networks using a periodic sequence of network energy saving (NES) states. Some aspects more specifically relate to operating a network node in different NES states over time based on the periodic sequence of NES states (for example, a default or normal mode and one or more sleep or low power modes associated with configurations to save power and maintain network operation), where each NES state may be associated with an antenna configuration of the network node. For example, in some aspects, the quantity of antenna panels, antenna sub-panels, and/or antenna ports that are in use at the network node at any particular time may depend on the NES state in which the network node is operating at that time. Accordingly, in some aspects, the network node may configure one or more served UEs with a periodic sequence of NES states, which enables the served UEs to adapt a local antenna configuration used to receive downlink signals from or transmit uplink signals to the network node based on the antenna configuration in use at the network node. For example, in some aspects, the served UEs may adapt a maximum quantity of downlink multiple input multiple output (MIMO) layers that are used to receive downlink transmissions from the network node in a current time interval based on the NES state that the network node is operating in during the current time interval. Additionally or alternatively, the served UEs may adapt a sounding reference signal (SRS) configuration (for example, an SRS antenna sounding configuration and/or an SRS resource or SRS resource set) used to perform SRS transmissions in a current time interval based on the NES state in which the network node is operating.

Particular aspects of the subject matter described in this disclosure can be implemented to realize one or more of the following potential advantages. In some examples, the described techniques can enable a semi-static approach to reduce network energy consumption by associating each NES state in a periodic sequence of NES states with a corresponding antenna configuration for a network node. Furthermore, in some examples, the described techniques can be used to dynamically adapt the maximum quantity of downlink MIMO layers and/or the SRS configuration used at a UE according to the current antenna configuration for the network node, which may enable power savings at the UE in cases where the network node is communicating using an antenna configuration in which one or more antenna panels, sub-panels, and/or ports are disabled (for example, during a time interval associated with low downlink traffic) and/or improved performance in cases where the network node is communicating using an antenna configuration in which the one or more antenna panels, sub-panels, and/or ports are turned on (for example, during a time interval when a cell load is high).

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node 110, information that indicates a periodic sequence of NES states, each NES state in the periodic sequence of NES states associated with an antenna configuration of the network node 110; and receive, from the network node 110 during a current time period, one or more downlink transmissions using a maximum quantity of MIMO layers associated with an active NES state for the current time period, the active NES state identified based at least in part on the periodic sequence of NES states. Additionally or alternatively, the communication manager 140 may receive, from a network node 110, information that indicates a periodic sequence of NES states, each NES state in the periodic sequence of NES states associated with an antenna configuration of the network node 110; and transmit, to the network node 110 during the current time period, one or more SRS transmissions using an SRS antenna sounding configuration associated with an active NES state for the current time period, the active NES state identified based at least in part on the periodic sequence of NES states. Additionally or alternatively, the communication manager 140 may perform one or more other operations described herein.

Figure 2:
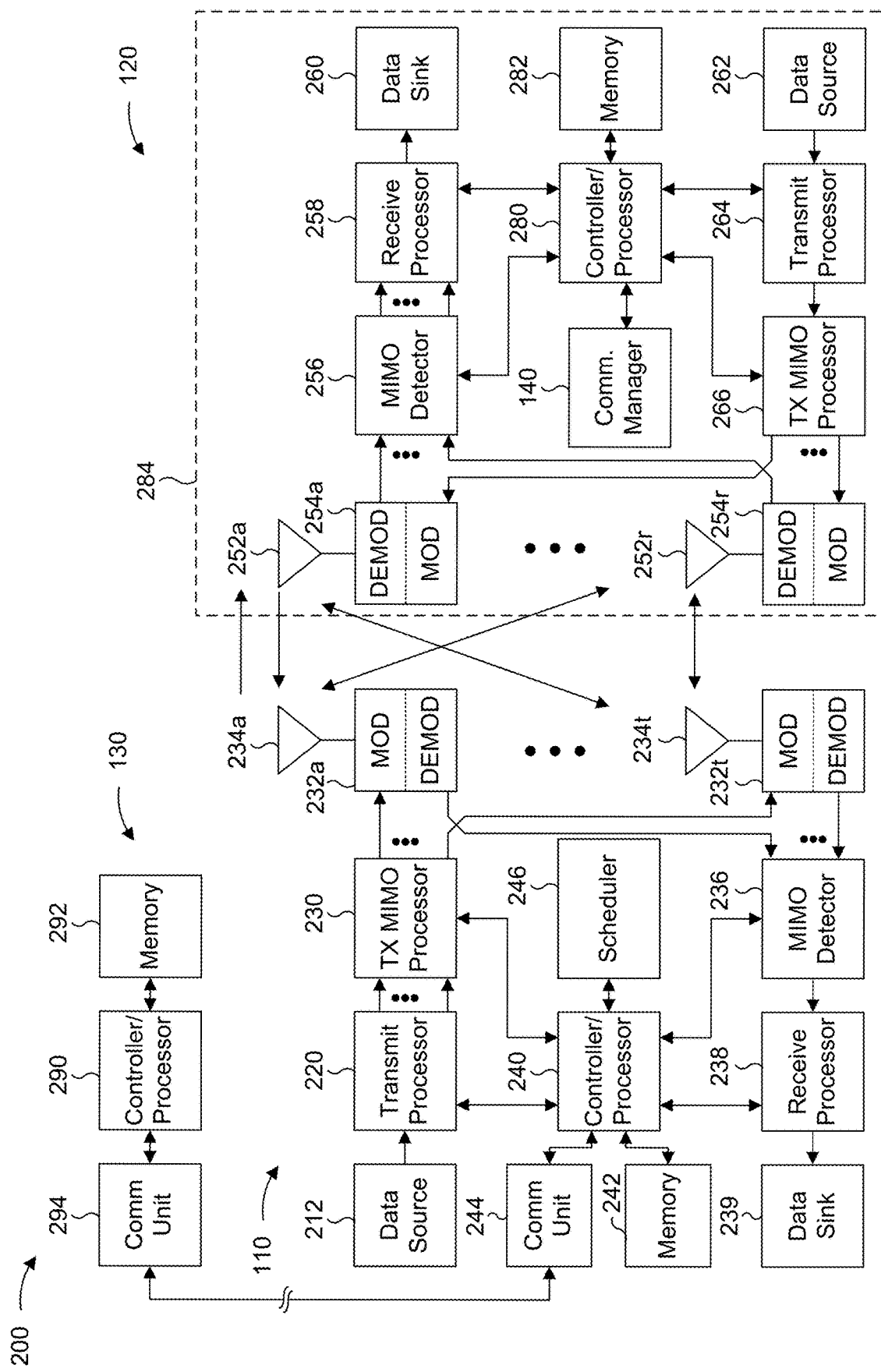
FIG. 2 is a diagram illustrating an example network node in communication with a user equipment (UE) in a wireless network in accordance with the present disclosure.

FIG. 2 is a diagram illustrating an example 200 of a network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) MIMO processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with joint antenna adaptation in energy saving networks, as described in more detail elsewhere herein. For example, the controller/processor 240 of the network node 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, the UE 120 includes means for receiving, from a network node 110, information that indicates a periodic sequence of NES states, each NES state in the periodic sequence of NES states associated with an antenna configuration of the network node; and/or means for receiving, from the network node 110 during a current time period, one or more downlink transmissions using a maximum quantity of MIMO layers associated with an active NES state for the current time period, the active NES state identified based at least in part on the periodic sequence of NES states. Additionally or alternatively, the UE 120 includes means for receiving, from a network node 110, information that indicates a periodic sequence of NES states, each NES state in the periodic sequence of NES states associated with an antenna configuration of the network node 110; and/or means for transmitting, to the network node 110 during a current time period, one or more SRS transmissions using an SRS antenna sounding configuration associated with an active NES state for the current time period, the active NES state identified based at least in part on the periodic sequence of NES states. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
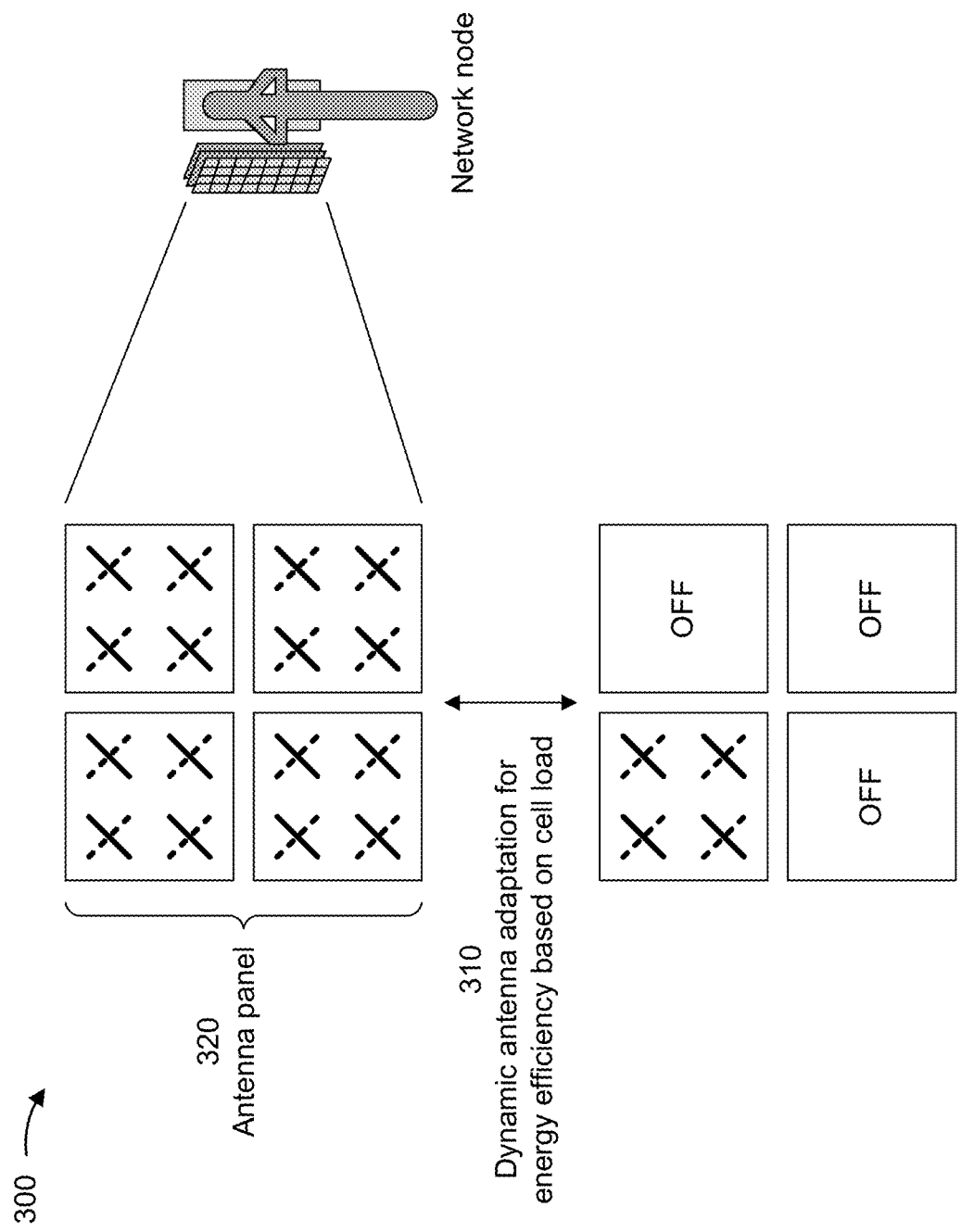
FIG. 3 is a diagram illustrating an example of dynamic network-side antenna adaptation in accordance with the present disclosure.

FIG. 3 is a diagram illustrating an example 300 of dynamic network-side antenna adaptation in accordance with the present disclosure. For various reasons, including climate change mitigation, environmental sustainability, and network cost reduction, network energy saving and/or network energy efficiency measures are expected to have increased importance in wireless network operations. For example, although NR generally offers a significant energy efficiency improvement per gigabyte over previous generations (for example, LTE), new NR use cases and/or the adoption of millimeter wave frequencies may require more network sites, more network antennas, larger bandwidths, and/or more frequency bands, which could potentially lead to more efficient wireless networks that nonetheless have higher energy requirements and/or cause more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity consumption). The largest proportion of energy consumption and/or energy costs are associated with a RAN, which accounts for about half of the energy consumption in a wireless network, with data centers and fiber transport accounting for smaller shares. Accordingly, measures to increase network energy savings and/or improve network energy efficiency are important factors that may drive adoption and/or expansion of wireless networks.

One way to increase energy efficiency in a RAN may be to use dynamic antenna adaptation in a network node that communicates using massive MIMO technology, which tends to consume significant power. For example, in an LTE network, a network node that supports massive MIMO technology may communicate using a baseband unit (BBU) that processes baseband signals and communicates with a core network through a physical interface and a remote radio unit (RRU) that performs transmit and receive radio frequency (RF) functions. In an LTE network, the per-cell power consumption (for example, in watts) is slightly larger for the RRU compared to the BBU, and the per-cell power consumption does not vary significantly with cell load. In an NR network, however, a network node that supports massive MIMO technology may communicate using a BBU and an active antenna unit (AAU) that consumes significantly more power than the BBU and the RU associated with a network node in an LTE network (for example, because NR operates at a higher data rate and/or a higher bandwidth than LTE).

For example, in an NR network, the BBU and the AAU of a network node may consume 2.4 times the power of the BBU and RRU in an LTE network node when the cell load is low (for example, 0%), 2.6 times the power of the BBU and RRU in an LTE network node when the cell load is moderate (for example, 50%), or 3 times the power of the BBU and RRU in an LTE network node when the cell load is high (for example, 100%), where "cell load" in this context generally refers to the proportion of frequency resources within a carrier that are being utilized at a given time. Furthermore, in an NR network node, the AAU generally consumes significantly more power than the BBU, and the proportion of power consumption attributable to the AAU increases as the cell loading increases (for example, because the BBU has a relatively static power consumption regardless of cell loading, but the power consumption of the AAU increases when the cell loading increases). Accordingly, because the AAU represents the most power-hungry component in an NR network node that supports massive MIMO technology, improving energy efficiency of the AAU can have a significant impact on overall network energy consumption.

Accordingly, as shown in FIG. 3, in an operation 310, a network node that supports massive MIMO communication may enable dynamic antenna adaptation based on a current and/or predicted cell load in order to improve energy efficiency. For example, to enable massive MIMO communication, a network node may generally need to have multiple co-located antenna panels that each include multiple antenna ports. For example, FIG. 3 shows an example antenna panel 320 that includes four (4) sub-panels, and each sub-panel includes several antenna ports (shown as dashed and solid intersecting lines) that each map to one or more physical antennas. For example, in FIG. 3, each diagonal line included in the antenna panel 320 corresponds to one (1) antenna port and a color of the diagonal line represents a polarization of the antenna port (for example, solid diagonal lines may correspond to antenna ports with a horizontal polarization and dashed diagonal lines may correspond to antenna ports with a vertical polarization, or vice versa). In general, each antenna panel 320 is equipped with various power amplifiers and an antenna subsystem, which consume significant power. Accordingly, in order to save power or otherwise utilize energy more efficiently, the network node may dynamically adapt an antenna configuration based on a current and/or predicted cell load. For example, when the cell load is low or predicted to be low, the network node may turn one or more antenna panels, sub-panels, transceiver units (TxRUs), and/or antenna ports off to reduce energy consumption, and the network node may turn most or all antenna panels, sub-panels, TxRUs, and/or antenna ports on to increase capacity when the cell load is high or predicted to be high.

Figure 4:
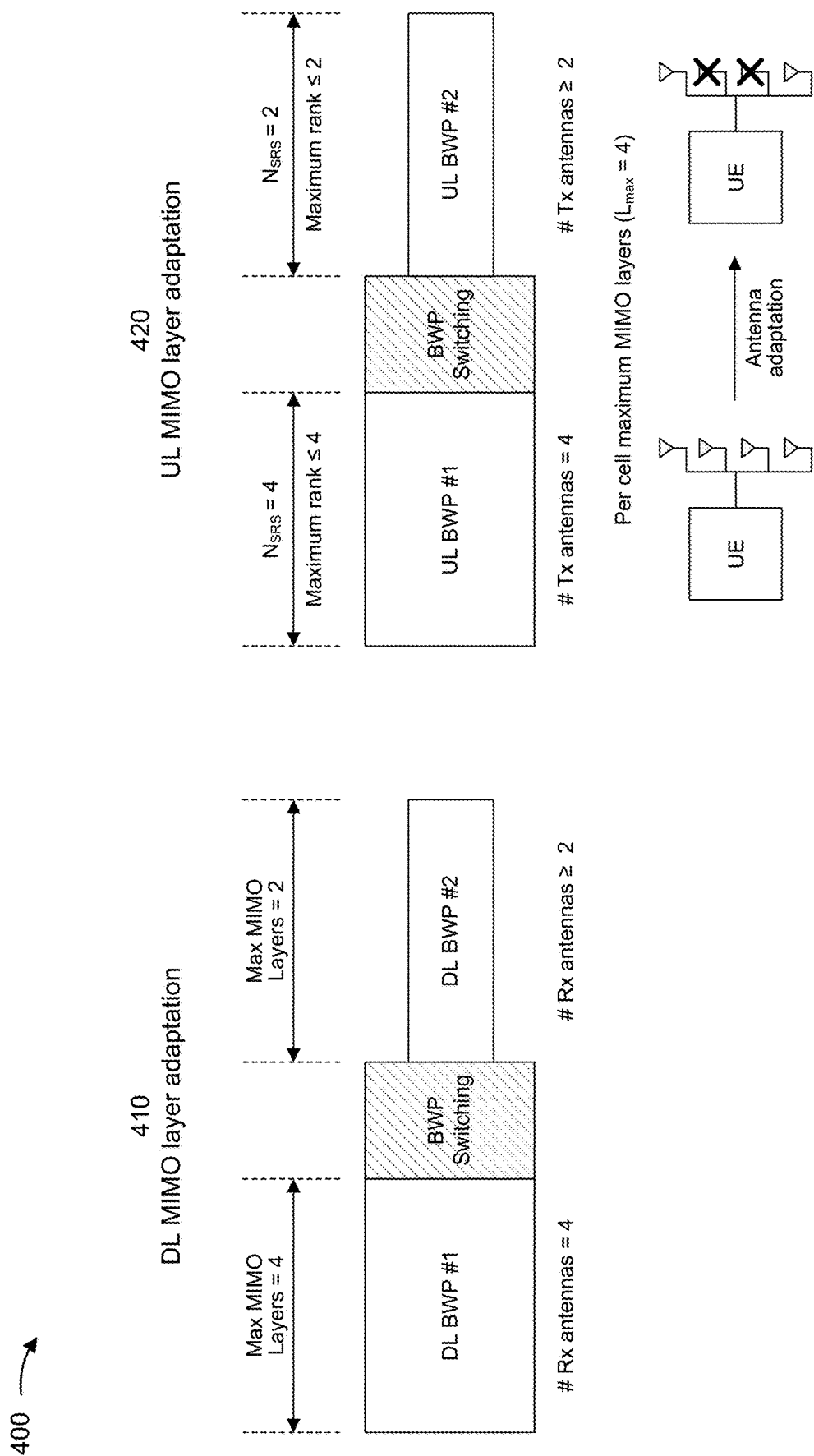
FIG. 4 is a diagram illustrating examples of MIMO layer adaptation in accordance with the present disclosure.

FIG. 4 is a diagram illustrating examples 400 of MIMO layer adaptation in accordance with the present disclosure. In particular, FIG. 4 illustrates an example 410 of downlink MIMO layer adaptation that may be performed at a UE and an example 420 of uplink MIMO layer adaptation that may be performed at a UE in a wireless network.

In particular, as described herein, a UE may be configured to perform downlink MIMO layer adaptation, where a maximum quantity of downlink MIMO layers that the UE is to use to receive downlink transmissions from a network node is adapted to enable energy savings at the UE. For example, in some cases, a network node may transmit one or more radio resource control (RRC) messages to a UE to indicate the maximum quantity of MIMO layers per cell for downlink transmissions (for example, using a maxMIMO-Layers parameter included in a PDSCH-ServingCellConfig information element (IE)). Accordingly, in order to control energy consumption and/or downlink performance at the UE, the network node may indicate the maximum quantity of downlink MIMO layers, which generally relates to the quantity of antennas that the UE is to use to receive downlink transmissions from the network node. In this way, the network node may dynamically configure the maximum quantity of downlink MIMO layers to accommodate dynamic traffic patterns and enable corresponding power savings at the UE (for example, increasing the maximum quantity of downlink MIMO layers to improve downlink performance when there is substantial downlink traffic and/or decreasing the maximum quantity of downlink MIMO layers to save power at the UE when downlink traffic has a low volume.

Furthermore, in some cases, the network node and/or the UE may support enhanced techniques to adapt the maximum number of downlink MIMO layers, such as supporting a maximum quantity of downlink MIMO layers per downlink bandwidth part (BWP). In such cases, the network node may configure the maximum quantity of downlink MIMO layers per downlink BWP such that the UE can operate using a reduced quantity of antennas and/or a reduced quantity of receiver chains to save power in certain scenarios (for example, a low amount of downlink traffic). For example, in FIG. 4, example 410 depicts a scenario where a network node configures a UE with two (2) downlink BWPs (shown as DL BWP #1 and DL BWP #2) to accommodate different traffic patterns and/or UE power saving needs. For example, in FIG. 4, the first downlink BWP may be associated with a wideband configuration with a maximum of four (4) downlink MIMO layers (for example, four (4) receive (Rx) antennas are used to receive downlink traffic), which may be suitable when the UE needs a high downlink data rate. As further shown, the second downlink BWP may be associated with a narrowband configuration with a maximum of two (2) downlink MIMO layers (for example, two (2) or more Rx antennas are used to receive downlink traffic), which may be suitable when downlink traffic is low and/or to reduce power consumption or increase power savings at the UE. Furthermore, BWP switching may be used to facilitate switching between the different scenarios (for example, the network node may indicate a BWP switch to indicate a change in the maximum quantity of downlink MIMO layers used at the UE).

Additionally or alternatively, a UE may be configured to perform uplink MIMO layer adaptation, where a maximum quantity of uplink MIMO layers that the UE is to use on an uplink may be adapted to improve uplink reliability and/or enable energy savings at the UE. For example, in some cases, a network node may configure a maximum quantity of uplink MIMO layers per BWP for codebook-based physical uplink shared channel (PUSCH) transmissions (for example, using a maxRank field included in a pusch-Config IE). However, for non-codebook-based PUSCH transmissions, the network node may configure the maximum quantity of uplink MIMO layers on a per-cell level (for example, using a maxMIMO-Layers field included in a PUSCH-Serving-CellConfig IE). For example, in FIG. 4, example 420 depicts a scenario where a network node configures a UE with two (2) uplink BWPs (shown as UL BWP #1 and UL BWP #2) to enable an implicit non-codebook-based MIMO configuration per uplink BWP. For example, for non-codebook-based uplink transmission, the quantity of uplink ports that the UE uses to transmit may be determined from an SRS resource indicator (SRI) or from one or more SRIs when the network node indicates multiple SRS resources. In general, the SRI may depend on the maximum quantity of uplink MIMO layers per-cell, $L_{max}$, which may be indicated by the maxMIMO-Layers parameter in the PUSCH-ServingCell-Config IE or determined by a capability of the UE in cases where the maxMIMO-Layers parameter is not provided in the PUSCH-ServingCellConfig IE. In addition, the SRI may depend on a quantity of SRS resources, $N_{SRS}$, in an SRS resource set associated with the SRI. Accordingly, in some cases, the quantity of SRS resources associated with a non-codebook usage may be configured per BWP, which may implicitly limit the maximum scheduled uplink rank. For example, in FIG. 4, a maximum of four (4) uplink MIMO layers are configured per-cell ($L_{max}$=4), and the first uplink BWP is configured with four (4) SRS resources ($N_{SRS}$=4), whereby the maximum scheduled rank in the first uplink BWP is 4 and the UE may perform uplink transmissions in the first uplink BWP using up to 4 transmit (Tx) antennas. Furthermore, the second uplink BWP is configured with two (2) SRS resources ($N_{SRS}$=2), whereby the maximum scheduled rank in the second uplink BWP is 2 and the UE may perform uplink transmissions using two or more Tx antennas. Furthermore, in a similar manner as downlink MIMO adaptation, BWP switching may be used to switch between the different scenarios.

Accordingly, as described herein, a UE may be configured to adapt a maximum quantity of downlink MIMO layers and/or a maximum quantity of uplink MIMO layers to accommodate different traffic patterns and/or enable power savings in different scenarios. However, in cases where the network node supports dynamic antenna adaptation (for example, to use energy more efficiently depending on cell load or other factors), the change in antenna configuration parameters may necessitate adaptation to the antenna configuration that the UE uses to receive downlink signals from and/or transmit uplink signals to the network node. For example, as described herein, a network node may support dynamic antenna adaptation techniques that allow the network node to turn off one or more antenna ports, TxRUs, antenna panels, and/or TRPs efficiently and dynamically when there is no downlink traffic or low downlink traffic. Accordingly, as the quantity of Tx antenna ports and/or TRPs used by the network node is reduced, the maximum number of downlink MIMO layers for a served UE may be reduced accordingly. Although the network node can implement dynamic BWP switching to dynamically adapt a maximum quantity of downlink MIMO layers or otherwise dynamically inform the UE regarding an updated maximum quantity of downlink MIMO layers, relying on the BWP switching framework suffers from drawbacks and limitations. For example, in cases where the network node and/or the UE supports only one BWP (for example, the UE only supports basic BWP operation with restriction), dynamically adapting the maximum quantity of downlink MIMO layers via BWP switching would not work. Furthermore, although dynamically adapting the maximum quantity of downlink MIMO layers may work when dynamic BWP switching is possible, the network node may have to configure BWP switching relatively often in order to realize optimal network energy savings, which may introduce delays and/or additional power consumption at the UE (for example, due to the need to perform frequent BWP switching). Furthermore, adapting uplink MIMO configurations may pose similar challenges.

Various aspects relate generally to enabling joint antenna adaptation in energy saving networks using a periodic sequence of NES states. Some aspects more specifically relate to operating a network node in different NES states over time based on the periodic sequence of NES states (for example, a default or normal mode and one or more sleep or low power modes associated with configurations to save power and maintain network operation), where each NES state may be associated with an antenna configuration of the network node. For example, in some aspects, the quantity of antenna panels, antenna sub-panels, and/or antenna ports that are in use at the network node at any particular time may depend on the NES state in which the network node is operating at that time. Accordingly, in some aspects, the network node may configure one or more served UEs with a periodic sequence of NES states, which enables the served UEs to adapt a local antenna configuration used to receive downlink signals from or transmit uplink signals to the network node based on the antenna configuration in use at the network node. For example, in some aspects, the served UEs may adapt a maximum quantity of downlink MIMO layers that are used to receive downlink transmissions from the network node in a current time interval based on the NES state that the network node is operating in during the current time interval. Additionally or alternatively, the served UEs may adapt an SRS configuration (for example, an SRS antenna sounding configuration and/or an SRS resource or SRS resource set) used to perform SRS transmissions in a current time interval based on the NES state in which the network node is operating.

Particular aspects of the subject matter described in this disclosure can be implemented to realize one or more of the following potential advantages. In some examples, the described techniques can enable a semi-static approach to reduce network energy consumption by associating each NES state in a periodic sequence of NES states with a corresponding antenna configuration for a network node. Furthermore, in some examples, the described techniques can be used to dynamically adapt the maximum quantity of downlink MIMO layers and/or the SRS configuration used at a UE according to the current antenna configuration for the network node, which may enable power savings at the UE in cases where the network node is communicating using an antenna configuration in which one or more antenna panels, sub-panels, and/or ports are disabled (for example, during a time interval associated with low downlink traffic) and/or improved performance in cases where the network node is communicating using an antenna configuration in which the one or more antenna panels, sub-panels, and/or ports are turned on (for example, during a time interval when a cell load is high).

Figure 5:
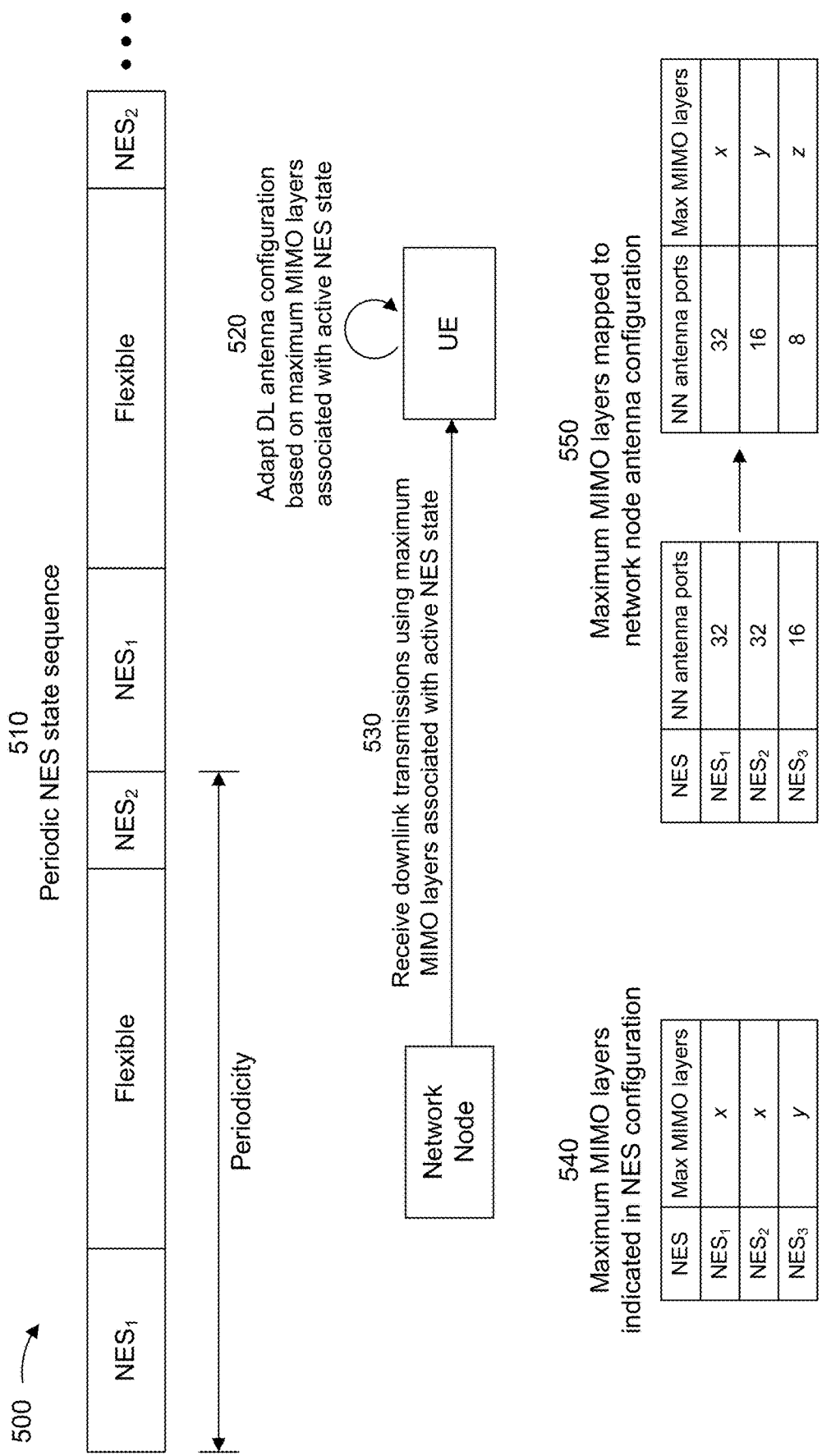
FIGS. 5-6 are diagrams illustrating examples associated with joint antenna adaptation in energy saving networks in accordance with the present disclosure.

FIG. 5 is a diagram illustrating an example 500 associated with joint antenna adaptation in energy saving networks in accordance with the present disclosure. As shown in FIG. 5, example 500 includes communication between a network node (for example, network node 110) and a UE (for example, UE 120). In some aspects, the network node and the UE may communicate in a wireless network, such as wireless network 100. The network node and the UE may communicate via a wireless access link, which may include an uplink and a downlink.

As shown in FIG. 5, in a first operation 510, the network node may transmit, and the UE may receive, information that indicates a periodic sequence of NES states, where each NES state may be associated with an antenna configuration of the network node. For example, as described herein, one potential approach to increasing energy efficiency in a RAN may be to adapt network energy consumption models to achieve more efficient operation dynamically and/or semi-statically. For example, power consumption in a RAN can generally be split into a dynamic portion, in which power is consumed only when data transmission and/or reception is ongoing, and a static portion, in which power is consumed all of the time to maintain the operation of radio access devices even when data transmission and/or reception is not ongoing. Accordingly, one potential approach to improve network energy savings may be to adapt power consumption models from the network perspective by reducing relative energy consumption for downlink and/or uplink communication (for example, considering factors such as power amplifier (PA) efficiency, quantities of TxRUs, and/or network load, among other examples), enabling network sleep states and associated transition times, and/or defining appropriate reference parameters and/or configurations. For example, different NES states may be configured to enable granular adaptation of transmission and/or reception to reduce energy consumption using techniques in time, frequency, spatial, and/or power domains, with potential support and/or feedback from UEs and/or potential UE assistance information.

Accordingly, as shown in FIG. 5, the network node may be configured to operate in different NES states over time, where each NES state may use one or more techniques to adapt transmission and/or reception in time, frequency, spatial, and/or power domains. For example, in some aspects, the NES states may include a normal operation mode (which may also be referred to as a legacy mode or a default mode) and one or more sleep modes that may be associated with a lower power consumption than the normal operation mode. In general, a network node may transition between different NES states to save power and maintain network operation (for example, minimizing impact on key performance indicators (KPIs) such as spectral efficiency, capacity, user perceived throughput (UPT), latency, UE power consumption, complexity, handover performance, call drop rate, and/or initial access performance). Furthermore, the network node may transition between different sleep modes based on traffic demands (for example, entering a light sleep mode when traffic demands are slightly lower than usual and/or entering a deep sleep mode when traffic demands are much lower than usual), and different sleep modes may be associated with different energy saving techniques (for example, one or more antenna panels, antenna ports, and/or radio frequency (RF) chains may be turned off in the deep sleep mode but remain on in the light sleep mode). Accordingly, in some aspects, the normal operation mode and the different sleep modes may vary in terms of power consumption and may be associated with different transition times (for example, a transition time to or from the deep sleep mode may be longer than a transition time to or from the light sleep mode).

In some cases, as described herein, an NES state may generally correspond to a particular set of configurations, communication parameters, and/or UE behaviors. For example, an NES state may include a set of configurations, communication parameters, and/or UE behaviors associated with one or more energy saving techniques that are implemented in the time, frequency, spatial, and/or power domain to reduce energy consumption. For example, a network node may be configured to not transmit a synchronization signal block (SSB) to reduce energy consumption in a first NES state (for example, an SSB-less NES state), and may be configured to employ other energy saving techniques such as turning off one or more antenna ports and/or antenna panels in a second NES state. Furthermore, in some cases, an NES state may be associated with a set of configurations, communication parameters, and/or UE behaviors associated with the normal or legacy mode of network operation. Accordingly, because one design objective in energy-efficient wireless networks is to achieve more efficient operation dynamically and/or semi-statically, the network node may configure a semi-static pattern to achieve network energy savings. For example, as shown in FIG. 5, the semi-static pattern (for example, configured via RRC signaling) may include a sequence of NES states that the network node follows in accordance with a given periodicity (for example, in FIG. 5, the network node operates in accordance with a first NES state, shown as $NES_1$, for a first time period, then operates in a flexible mode for a second time period, then operates in accordance with a second NES state, shown as $NES_2$, for a third time period, and the pattern then repeats). Further, in cases where the semi-static pattern (or periodic NES state sequence) includes a time period associated with a flexible mode, the network node may operate in accordance with any suitable NES state during the time period corresponding to the flexible mode (for example, depending on current traffic conditions), and the NES state that the network node selects for the time period corresponding to the flexible mode may be dynamically indicated to the UE.

In some aspects, as described herein, each NES state in the sequence may be associated with a set of configurations, communication parameters, and/or UE behaviors, which may include at least an antenna configuration that the network node uses in the corresponding NES state. For example, in the first NES state, the network node may operate using an antenna configuration in which thirty-two (32) antenna ports are active (for example, to provide maximum throughput), and the second NES state may be associated with an antenna configuration in which eight (8) antenna ports are active (for example, to conserve energy relative to the first NES state). Furthermore, it will be appreciated that a particular antenna configuration may be shared among different NES states. For example, in some aspects, the network node may use 32 antenna ports in the first NES state and the second NES state, and may refrain from transmitting an SSB in the second NES state to conserve energy relative to the first NES state (for example, each NES state may be associated with one or more energy saving techniques that may be implemented in a time domain, a frequency domain, a spatial domain, and/or a power domain). Accordingly, as described herein, each NES state in the periodic NES state sequence may be associated with a corresponding antenna configuration of the network node, but the same antenna configuration could be used in more than one NES state.

As further shown in FIG. 5, in a second operation 520, the UE may adapt a downlink antenna configuration to use in a current time interval based on a maximum quantity of MIMO layers that is associated with an active (or current) NES state. For example, based on the periodic NES state sequence configured by the network node, the UE may have a capability to determine the NES state in which the network node is operating for various time intervals, and the UE may adapt the downlink antenna configuration (for example, the quantity of Rx antennas used at the UE) in each time interval based on the maximum quantity of downlink MIMO layers associated with the NES state that is active in each time interval. For example, given the periodic NES state sequence depicted in FIG. 5, the UE may determine the maximum quantity of MIMO layers associated with the first NES state. The UE may then adapt, for a duration that the first NES state is active, the downlink antenna configuration based on the maximum quantity of downlink MIMO layers associated with the first NES state. Furthermore, the UE may employ a similar approach to adapt the downlink antenna configuration during a subsequent time period associated with the flexible mode (for example, depending on which NES state is dynamically indicated to be active during the time period associated with the flexible mode) and a subsequent time period when the second NES state is active. Accordingly, in a third operation 530, the UE may receive downlink transmissions from the network node during different time periods using the maximum quantity of downlink MIMO layers associated with respective NES states that are active during the different time periods. In other words, the maximum quantity of downlink MIMO layers (or Rx antennas) that the UE uses to receive downlink transmissions from the network node may change dynamically over time depending on the periodic NES state sequence that defines which NES state is active at any particular time (for example, such that the maximum quantity of downlink MIMO layers used at the UE appropriately captures dynamic adaptation in the quantity of antennas or antenna ports used by the network node in each NES state).

In some aspects, the network node and the UE may support one or more techniques to indicate or otherwise define the maximum quantity of downlink MIMO layers associated with each NES state. For example, in some aspects, the network node may transmit RRC signaling or other suitable information to the UE to configure each NES state supported by the network node (for example, each NES state included in the periodic NES state sequence and any other NES states that the network node may support using to improve performance or conserve energy), and the NES configuration associated with each NES state may include an IE or another suitable parameter to indicate the maximum quantity of downlink MIMO layers associated with the respective NES state. For example, FIG. 5 depicts an example 540 where the maximum quantity of downlink MIMO layers is indicated in an NES configuration associated with an NES state. For example, in FIG. 5, a first NES state (shown as NES') is associated with a first maximum quantity of downlink MIMO layers, x; a second NES state (shown as $NES_2$) is associated with the same maximum quantity of downlink MIMO layers as the first NES state (for example, the maximum quantity of downlink MIMO layers does not change when the network node switches from the first NES state to the second NES state or vice versa); and a third NES state (shown as NESS) is associated with a different maximum quantity of downlink MIMO layers, y. Accordingly, in some aspects, the maximum quantity of downlink MIMO layers may be configured independently for each NES state.

Additionally or alternatively, the network node may transmit RRC signaling or other suitable information to the UE to configure a mapping between different quantities of antenna ports used at the network node and the maximum quantity of downlink MIMO layers associated with each respective quantity of antenna ports used at the network node. In this case, the NES configuration associated with each NES state may indicate the quantity of antenna ports that the network node uses when operating in the corresponding NES state, and the UE may refer to the mapping to identify the maximum quantity of downlink MIMO layers associated with an active NES state. For example, FIG. 5 depicts an example 550 where the network node configures a mapping between different quantities of antenna ports used at the network node and the maximum quantity of downlink MIMO layers associated with each respective quantity of antenna ports. For example, in FIG. 5, the mapping indicates that a network node antenna configuration that includes thirty-two (32) antenna ports is mapped to a maximum of x downlink MIMO layers, a network node antenna configuration that includes sixteen (16) antenna ports is mapped to a maximum of y downlink MIMO layers, and a network node antenna configuration that includes eight (8) antenna ports is mapped to a maximum of z downlink MIMO layers. Accordingly, during time intervals when the currently active NES state is the first NES state or the second NES state, each of which are associated with an antenna configuration that includes 32 antenna ports, the UE may adapt the downlink antenna configuration to use a maximum of x downlink MIMO layers. Additionally or alternatively, during time intervals when the currently active NES state is the third NES state, which is associated with 16 antenna ports, the UE may adapt the downlink antenna configuration to use a maximum of y downlink MIMO layers. Additionally or alternatively, during time intervals when the currently active NES state is associated with 8 antenna ports, the UE may adapt the downlink antenna configuration to use a maximum of z downlink MIMO layers. Accordingly, in some aspects, the network node may generally configure a mapping between different quantities of antenna ports and corresponding maximum quantities of downlink MIMO layers, and the UE may refer to the mapping to identify the maximum quantity of downlink MIMO layers to use in a time interval based on the quantity of antenna ports associated with the NES state that is active during the time interval.

In some aspects, a maximum quantity of downlink MIMO layers may be configured under a cell configuration and/or under a BWP configuration (for example, the maximum quantity of downlink MIMO layers may be configured per cell or per BWP, as described in further detail above with reference to FIG. 4). Accordingly, the UE may use one or more techniques to identify which configuration to use to identify the maximum quantity of downlink MIMO layers when a periodic NES state is configured and a maximum quantity of downlink MIMO layers is configured in a cell and/or a BWP that the UE is using to communicate with the network node. For example, in cases where the periodic NES state sequence is defined per BWP, the maximum quantity of downlink MIMO layers associated with the configured NES states may override any maximum quantity of downlink MIMO layers that may be indicated in the BWP configuration, which overrides any maximum quantity of downlink MIMO layers that may be indicated in the cell configuration (for example, the maximum quantity of downlink MIMO layers may be determined by the NES state configuration when the periodic NES state sequence is defined per BWP). Alternatively, in cases where the periodic NES state sequence is defined per cell, the UE may use the maximum quantity of downlink MIMO layers associated with the NES configuration when the network node is operating in a mode other than a legacy (for example, a default or normal) mode. Otherwise, in cases where the periodic NES state sequence is defined per cell and the network node is operating in the legacy mode, the UE may use the maximum quantity of downlink MIMO layers associated with the active BWP configuration. Alternatively, in cases where the periodic NES state sequence is configured to operate in a set of one or more BWPs, the UE may apply the maximum quantity of downlink MIMO layers associated with the NES state configurations when communicating using a BWP in the set of BWPs associated with the periodic NES state sequence, and may otherwise use the maximum quantity of downlink MIMO layers associated with the active BWP configuration in other BWPs. Additionally or alternatively, in cases where the network node is operating in the flexible mode, the UE may use the maximum quantity of downlink MIMO layers associated with the active BWP configuration and may otherwise use the maximum quantity of downlink MIMO layers associated with the cell configuration if a maximum quantity of downlink MIMO layers is not configured for the active BWP.

Figure 6:
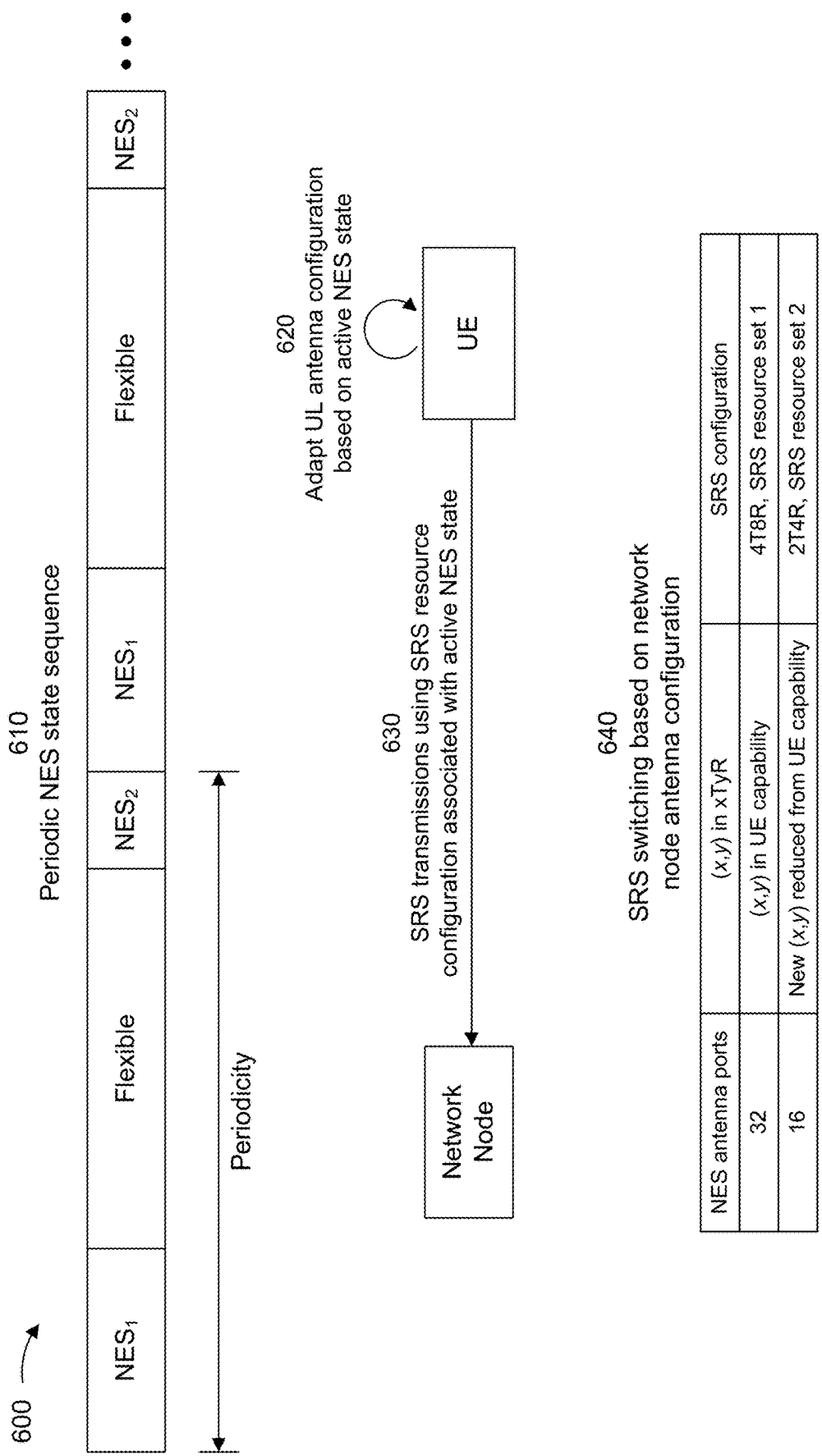

FIG. 6 is a diagram illustrating an example 600 associated with joint antenna adaptation in energy saving networks in accordance with the present disclosure. As shown in FIG. 6, example 600 includes communication between a network node (for example, network node 110) and a UE (for example, UE 120). In some aspects, the network node and the UE may communicate in a wireless network, such as wireless network 100. The network node and the UE may communicate via a wireless access link, which may include an uplink and a downlink.

As shown in FIG. 6, in a first operation 610, the network node may transmit, and the UE may receive, information that indicates a periodic sequence of NES states, where each NES state may be associated with an antenna configuration of the network node. For example, as described elsewhere herein, the network node may be configured to operate in different NES states over time, where each NES state may use one or more techniques to adapt transmission and/or reception in time, frequency, spatial, and/or power domains. In some aspects, each NES state in the periodic NES state sequence may be associated with a set of configurations, communication parameters, and/or UE behaviors, which may include at least an antenna configuration that the network node uses in the corresponding NES state. For example, in the first NES state, the network node may operate using an antenna configuration in which thirty-two (32) antenna ports are active and the second NES state may be associated with an antenna configuration in which eight (8) antenna ports are active (for example, to conserve energy relative to the first NES state). Furthermore, in some aspects, a particular antenna configuration may be shared among different NES states. For example, the network node may use the same quantity of antenna ports in the first NES state and the second NES state (for example, the network node does not perform dynamic antenna adaptation when switching between the first NES state and the second NES state), and the network node may employ one or more other energy saving techniques in time, frequency, spatial, and/or power domains to conserve energy in the first and/or second NES state. Accordingly, as described herein, each NES state in the periodic NES state sequence may generally be associated with a corresponding antenna configuration of the network node, but the same antenna configuration could be used in more than one NES state.

As further shown in FIG. 6, in a second operation 620, the UE may adapt an uplink antenna configuration to use in a current time interval based on an active (or current) NES state. For example, based on the periodic NES state sequence configured by the network node, the UE may have a capability to determine the NES state in which the network node is operating for various time intervals, and the UE may adapt the uplink antenna configuration in each time interval accordingly, based on the NES state that is active in each time interval. For example, given the periodic NES state sequence depicted in FIG. 6, the UE may determine a quantity of SRS resources, an SRS configuration, and/or a quantity of SRS antenna ports associated with the first NES state. The UE may then adapt, for a duration that the first NES state is active, the uplink antenna configuration based on the quantity of SRS resources, SRS configuration, and/or SRS antenna ports associated with the first NES state. Furthermore, the UE may employ a similar approach to adapt the uplink antenna configuration during a subsequent time period associated with the flexible mode (for example, depending on which NES state is dynamically indicated to be active during the time period associated with the flexible mode) and a subsequent time period when the second NES state is active. Accordingly, in a third operation 630, the UE may perform one or more SRS transmissions to the network node during different time periods using the quantity of SRS resources, the SRS configuration, and/or the SRS antenna ports associated with respective NES states that are active during the different time periods. In other words, the quantity of SRS resources, SRS configuration, and/or SRS antenna ports that the UE uses to perform SRS transmissions may change dynamically over time depending on the periodic NES state sequence, which defines the NES states that are active in different time intervals.

Accordingly, in some aspects, the UE may generally adapt one or more parameters related to how the UE transmits an SRS that the network node measures to estimate an uplink channel and receive uplink transmissions (for example, PUSCH and/or physical uplink control channel (PUCCH) transmissions) from the UE. For example, as described herein, the one or more parameters related to how the UE transmits an SRS in a given time interval may be adapted based on the antenna configuration associated with the NES state in which the network node is operating during the time interval. For example, the UE may transmit, to the network node, UE capability information that indicates an antenna switching capability represented as xTyR, which means that the UE has a capability to transmit an SRS on x antenna ports over a total of y antennas (for example, an antenna switching capability of 4T8R means that the UE can transmit an SRS on 4 antenna ports over a total of 8 antennas; other possible values may include 4T4R and/or 2T2R, among other examples).

Accordingly, in some aspects, each NES state that is associated with a given quantity of antenna ports may map to an SRS antenna sounding configuration xTyR and to a set of SRS resources and/or SRS resource sets. For example, FIG. 6 depicts an example 640 mapping for NES states associated with an antenna configuration with 32 antenna ports and NES states associated with an antenna configuration with 16 antenna ports (note that other mappings are possible, such as for NES states associated with 8 antenna ports or another suitable quantity of antenna ports). As shown in example 640, the UE capability information may indicate an antenna switching capability that includes certain values for x and y, which may be represented as (x,y), NES states associated with 32 antenna ports may be mapped to the (x,y) indicated in the UE capability information, and NES states associated with 16 antenna ports may be mapped to (x,y) values that are reduced relative to the (x,y) values indicated in the UE capability information. For example, if the UE capability information indicates an antenna switching capability of 4T8R, NES states associated with 32 antenna ports may be mapped to an SRS antenna sounding configuration of 4T8R, and NES states associated with 16 antenna ports may be mapped to an SRS antenna sounding configuration of 2T4R, which is a reduced or downgraded configuration relative to the indicated antenna switching capability of 4T8R.

Furthermore, each quantity of antenna ports may be associated with an SRS resource or an SRS resource set. For example, in FIG. 6, NES states associated with 32 antenna ports are associated with a first SRS resource set, and NES states associated with 16 antenna ports are associated with a second SRS resource set, where the second SRS resource set can be a subset of the first SRS resource set or a separate SRS resource set. For example, in some aspects, the network node may define an SRS resource configuration based on one or more NES states associated with a largest quantity of SRS antenna ports, and the UE may use that SRS resource configuration during any time intervals when the network node is operating in an NES state associated with the largest quantity of SRS antenna ports (for example, a legacy, default, or normal mode when the network node uses a maximum quantity of antenna ports). Otherwise, when the network node switches to a different NES state associated with fewer antenna ports, the UE may be configured to mute one or more SRS resources within the SRS resource configuration to fit the reduced or downgraded quantity of UE antenna ports that are used for SRS sounding. Alternatively, in some aspects, each SRS resource or SRS resource set may be mapped to one or more NES states, whereby the UE may transmit an SRS in a given time interval using the SRS resource or SRS resource set mapped to the active NES state.

Figure 7:
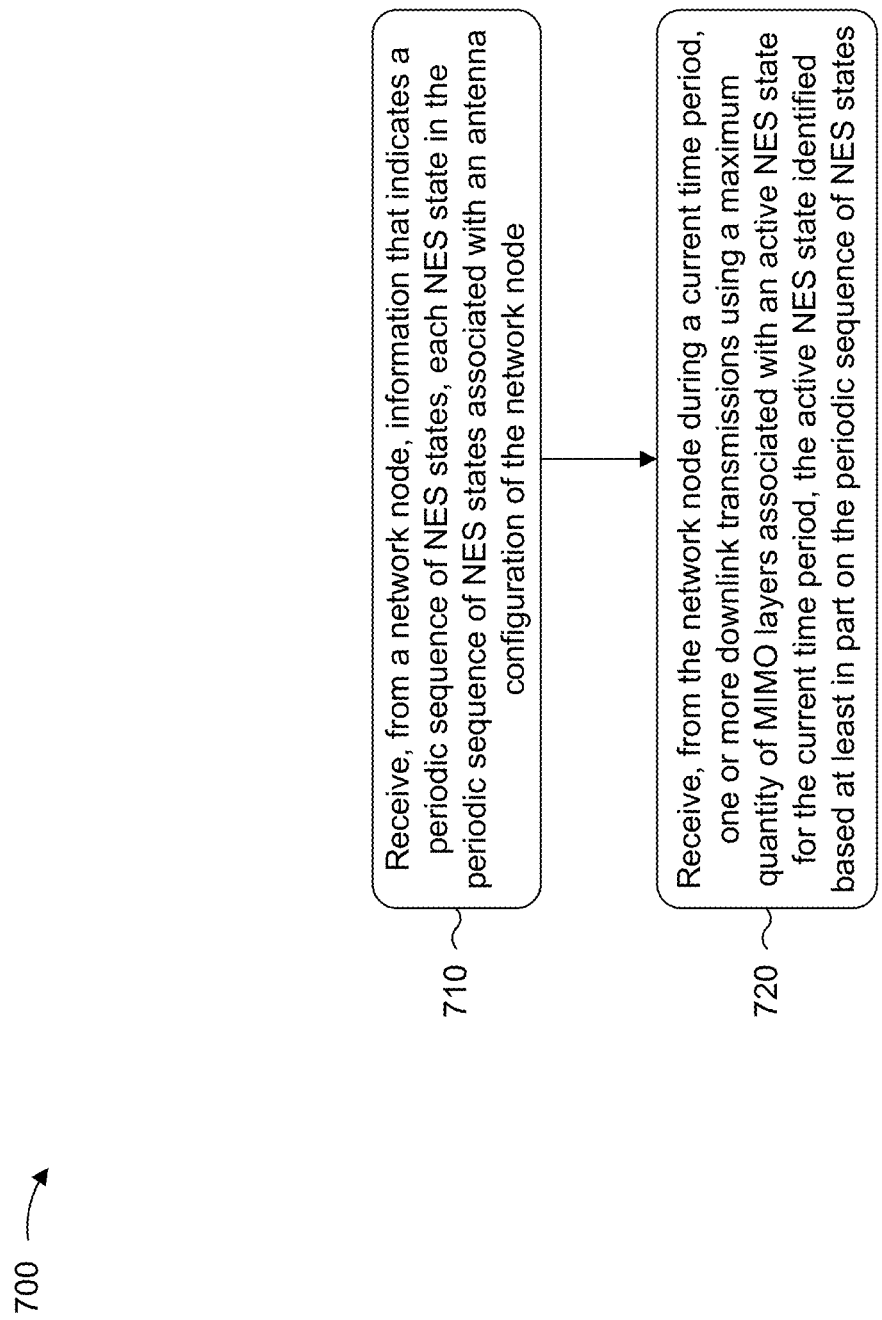
FIGS. 7-8 are flowcharts illustrating example processes performed, for example, by a UE in accordance with the present disclosure.

FIG. 7 is a flowchart illustrating an example process 700 performed, for example, by a UE that supports joint antenna adaptation in accordance with the present disclosure. Example process 700 is an example where the UE (for example, UE 120) performs operations associated with joint antenna adaptation in energy saving networks.

As shown in FIG. 7, in some aspects, process 700 may include receiving, from a network node, information that indicates a periodic sequence of NES states, each NES state in the periodic sequence of NES states associated with an antenna configuration of the network node (block 710). For example, the UE (such as by using communication manager 140 or reception component 902, depicted in FIG. 9) may receive, from a network node, information that indicates a periodic sequence of NES states, each NES state in the periodic sequence of NES states associated with an antenna configuration of the network node, as described above.

As further shown in FIG. 7, in some aspects, process 700 may include receiving, from the network node during a current time period, one or more downlink transmissions using a maximum quantity of MIMO layers associated with an active NES state for the current time period, the active NES state identified based at least in part on the periodic sequence of NES states (block 720). For example, the UE (such as by using communication manager 140 or reception component 902, depicted in FIG. 9) may receive, from the network node during a current time period, one or more downlink transmissions using a maximum quantity of MIMO layers associated with an active NES state for the current time period, the active NES state identified based at least in part on the periodic sequence of NES states, as described above.

Process 700 may include additional aspects, such as any single aspect or any combination of aspects described below or in connection with one or more other processes described elsewhere herein.

In a first additional aspect, process 700 includes receiving, from the network node, information that indicates the maximum quantity of MIMO layers for each NES state included in the periodic sequence of NES states in a respective NES configuration associated with the NES state, and identifying the maximum quantity of MIMO layers associated with the active NES state for the current time period based at least in part on the NES configuration associated with the active NES state for the current time period.

In a second additional aspect, alone or in combination with the first aspect, process 700 includes receiving, from the network node, information that indicates a mapping between quantities of antenna ports and values for the maximum quantity of MIMO layers, receiving, from the network node, information that indicates a quantity of antenna ports for each NES state included in the periodic sequence of NES states, and identifying the maximum quantity of MIMO layers associated with the active NES state for the current time period based at least in part on the quantity of antenna ports associated with the active NES state for the current time period.

In a third additional aspect, alone or in combination with one or more of the first and second aspects, process 700 includes identifying the maximum quantity of MIMO layers to use during the current time period from an NES configuration associated with the active NES state based at least in part on the periodic sequence of NES states being configured for an active bandwidth part associated with the current time period.

In a fourth additional aspect, alone or in combination with one or more of the first through third aspects, process 700 includes identifying the maximum quantity of MIMO layers to use during the current time period from an NES configuration associated with the active NES state based at least in part on the periodic sequence of NES states being configured for a cell.

In a fifth additional aspect, alone or in combination with one or more of the first through fourth aspects, process 700 includes identifying the maximum quantity of MIMO layers to use during the current time period from a bandwidth part configuration for the current time period based at least in part on the periodic sequence of NES states associating a normal mode with the current time period.

In a sixth additional aspect, alone or in combination with one or more of the first through fifth aspects, process 700 includes identifying the maximum quantity of MIMO layers to use during the current time period from a bandwidth part configuration for the current time period based at least in part on the periodic sequence of NES states not being configured for an active bandwidth part associated with the current time period.

In a seventh additional aspect, alone or in combination with one or more of the first through sixth aspects, process 700 includes identifying the maximum quantity of MIMO layers to use during the current time period from a bandwidth part configuration for the current time period based at least in part on the periodic sequence of NES states associating a flexible mode with the current time period.

In an eighth additional aspect, alone or in combination with one or more of the first through seventh aspects, process 700 includes identifying the maximum quantity of MIMO layers to use during the current time period from a cell configuration based at least in part on the periodic sequence of NES states associating a flexible mode with the current time period.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
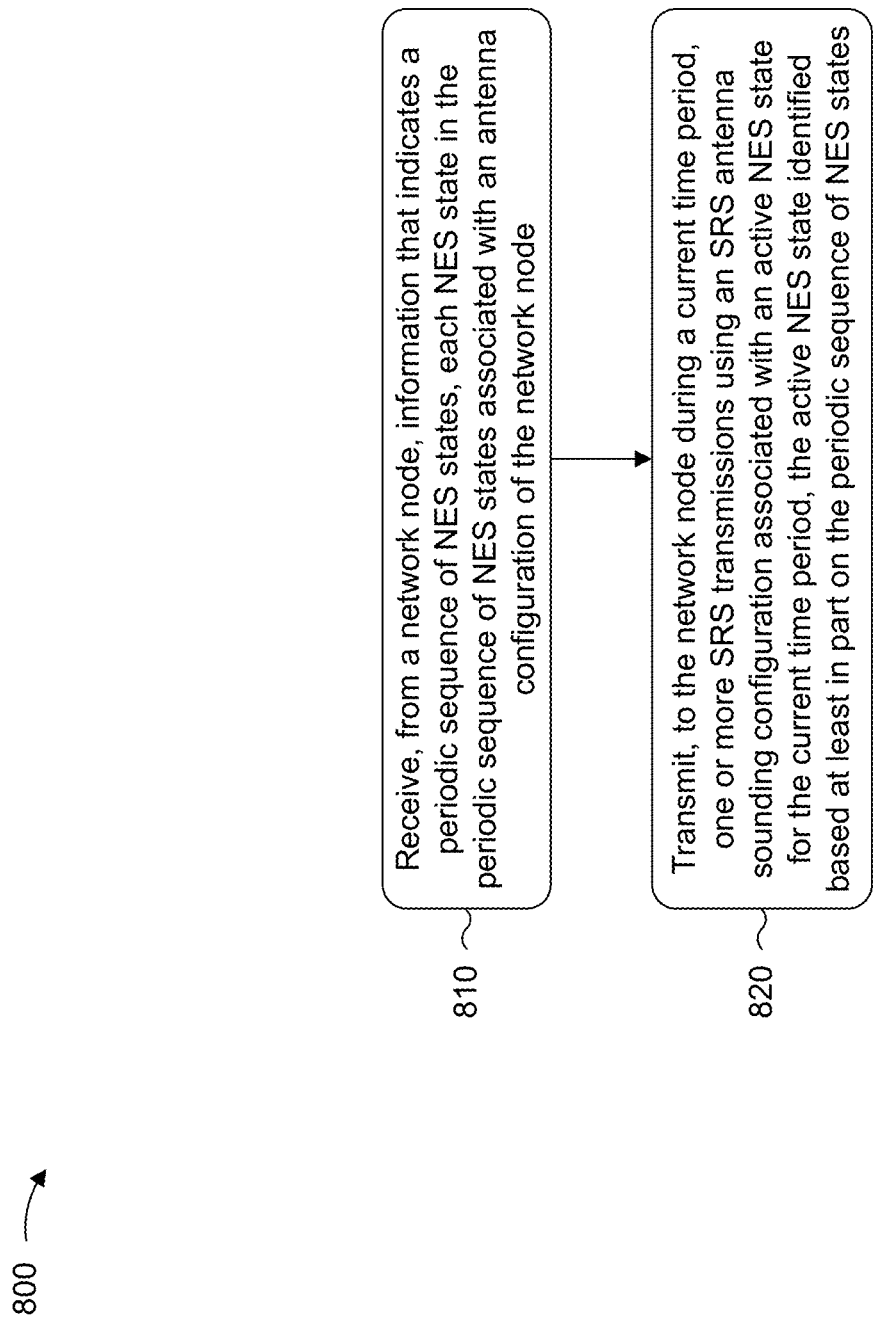

FIG. 8 is a flowchart illustrating an example process 800 performed, for example, by a UE that supports joint antenna adaptation in accordance with the present disclosure. Example process 800 is an example where the UE (for example, UE 120) performs operations associated with joint antenna adaptation in energy saving networks.

As shown in FIG. 8, in some aspects, process 800 may include receiving, from a network node, information that indicates a periodic sequence of NES states, each NES state in the periodic sequence of NES states associated with an antenna configuration of the network node (block 810). For example, the UE (such as by using communication manager 140 or reception component 902, depicted in FIG. 9) may receive, from a network node, information that indicates a periodic sequence of NES states, each NES state in the periodic sequence of NES states associated with an antenna configuration of the network node, as described above.

As further shown in FIG. 8, in some aspects, process 800 may include transmitting, to the network node during a current time period, one or more SRS transmissions using an SRS antenna sounding configuration associated with an active NES state for the current time period, the active NES state identified based at least in part on the periodic sequence of NES states (block 830). For example, the UE (such as by using communication manager 140 or transmission component 904, depicted in FIG. 9) may transmit, to the network node during a current time period, one or more SRS transmissions using an SRS antenna sounding configuration associated with an active NES state for the current time period, the active NES state identified based at least in part on the periodic sequence of NES states, as described above.

Process 800 may include additional aspects, such as any single aspect or any combination of aspects described below or in connection with one or more other processes described elsewhere herein.

In a first additional aspect, process 800 includes transmitting, to the network node, UE capability information that indicates an SRS resource configuration for an NES state having a largest quantity of SRS antenna ports, wherein the SRS antenna sounding configuration used in the current time period is based at least in part on the UE capability information.

In a second additional aspect, alone or in combination with the first aspect, the SRS antenna sounding configuration used in the current time period is the SRS resource configuration indicated in the UE capability information based at least in part on the active NES state for the current time period being the NES state having the largest quantity of SRS antenna ports.

In a third additional aspect, alone or in combination with one or more of the first and second aspects, the SRS antenna sounding configuration used in the current time period mutes one or more SRS resources relative to the SRS resource configuration indicated in the UE capability information based at least in part on the active NES state for the current time period being an NES state associated with fewer SRS antenna ports than the NES state having the largest quantity of SRS antenna ports.

In a fourth additional aspect, alone or in combination with one or more of the first through third aspects, the SRS antenna sounding configuration used in the current time period is mapped to a set of NES states that includes the active NES state for the current time period.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
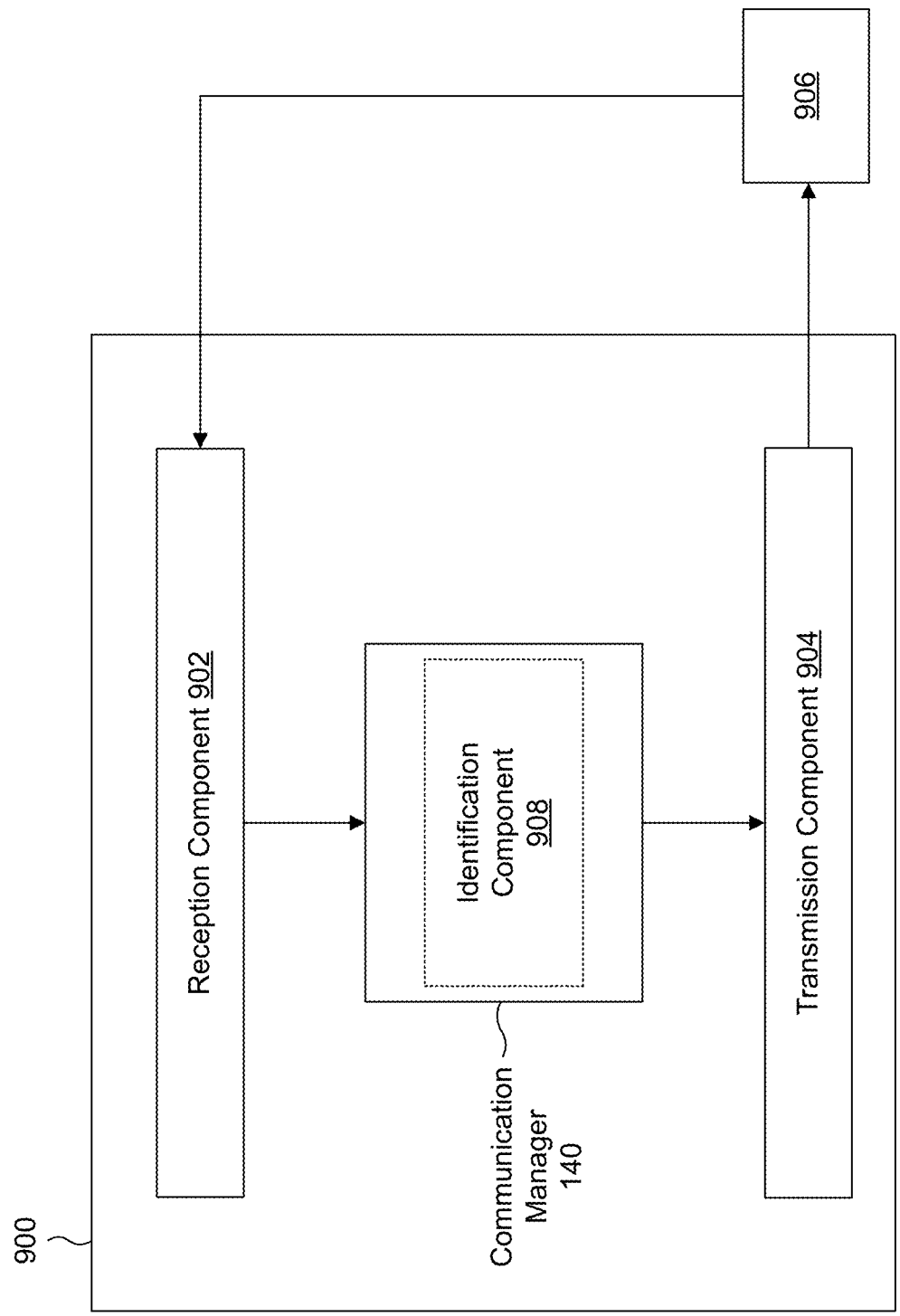
FIG. 9 is a diagram of an example apparatus for wireless communication in accordance with the present disclosure.

FIG. 9 is a diagram of an example apparatus 900 for wireless communication that supports joint antenna adaptation in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to perform one or more operations described herein in connection with FIGS. 5-6. Additionally or alternatively, the apparatus 900 may be configured to perform one or more processes described herein, such as process 700 of FIG. 7 and/or process 800 of FIG. 8. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the UE described above in connection with FIG. 2. In some aspects, the transmission component 904 may be co-located with the reception component 902 in a transceiver.

The communication manager 140 may receive or may cause the reception component 902 to receive, from a network node, information that indicates a periodic sequence of NES states, each NES state in the periodic sequence of NES states associated with an antenna configuration of the network node. The communication manager 140 may receive or may cause the reception component 902 to receive, from the network node during a current time period, one or more downlink transmissions using a maximum quantity of MIMO layers associated with an active NES state for the current time period, the active NES state identified based at least in part on the periodic sequence of NES states. In some aspects, the communication manager 140 may perform one or more operations described elsewhere herein as being performed by one or more components of the communication manager 140.

The communication manager 140 may receive or may cause the reception component 902 to receive, from a network node, information that indicates a periodic sequence of NES states, each NES state in the periodic sequence of NES states associated with an antenna configuration of the network node. The communication manager 140 may transmit or may cause the transmission component 904 to transmit, to the network node during a current time period, one or more SRS transmissions using an SRS antenna sounding configuration associated with an active NES state for the current time period, the active NES state identified based at least in part on the periodic sequence of NES states. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as an identification component 908. Alternatively, the set of components may be separate and distinct from the communication manager 140. In some aspects, one or more components of the set of components may include or may be implemented within a controller/processor, and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from a network node, information that indicates a periodic sequence of NES states, each NES state in the periodic sequence of NES states associated with an antenna configuration of the network node. The reception component 902 may receive, from the network node during a current time period, one or more downlink transmissions using a maximum quantity of MIMO layers associated with an active NES state for the current time period, the active NES state identified based at least in part on the periodic sequence of NES states.

The reception component 902 may receive, from the network node, information that indicates the maximum quantity of MIMO layers for each NES state included in the periodic sequence of NES states in a respective NES configuration associated with the NES state. The identification component 908 may identify the maximum quantity of MIMO layers associated with the active NES state for the current time period based at least in part on the NES configuration associated with the active NES state for the current time period.

The reception component 902 may receive, from the network node, information that indicates a mapping between quantities of antenna ports and values for the maximum quantity of MIMO layers. The reception component 902 may receive, from the network node, information that indicates a quantity of antenna ports for each NES state included in the periodic sequence of NES states. The identification component 908 may identify the maximum quantity of MIMO layers associated with the active NES state for the current time period based at least in part on the quantity of antenna ports associated with the active NES state for the current time period.

The identification component 908 may identify the maximum quantity of MIMO layers to use during the current time period from an NES configuration associated with the active NES state based at least in part on the periodic sequence of NES states being configured for an active bandwidth part associated with the current time period.

The identification component 908 may identify the maximum quantity of MIMO layers to use during the current time period from an NES configuration associated with the active NES state based at least in part on the periodic sequence of NES states being configured for a cell.

The identification component 908 may identify the maximum quantity of MIMO layers to use during the current time period from a bandwidth part configuration for the current time period based at least in part on the periodic sequence of NES states associating a normal mode with the current time period.

The identification component 908 may identify the maximum quantity of MIMO layers to use during the current time period from a bandwidth part configuration for the current time period based at least in part on the periodic sequence of NES states not being configured for an active bandwidth part associated with the current time period.

The identification component 908 may identify the maximum quantity of MIMO layers to use during the current time period from a bandwidth part configuration for the current time period based at least in part on the periodic sequence of NES states associating a flexible mode with the current time period.

The identification component 908 may identify the maximum quantity of MIMO layers to use during the current time period from a cell configuration based at least in part on the periodic sequence of NES states associating a flexible mode with the current time period.

The reception component 902 may receive, from a network node, information that indicates a periodic sequence of NES states, each NES state in the periodic sequence of NES states associated with an antenna configuration of the network node. The transmission component 904 may transmit, to the network node during a current time period, one or more SRS transmissions using an SRS antenna sounding configuration associated with an active NES state for the current time period, the active NES state identified based at least in part on the periodic sequence of NES states.

The transmission component 904 may transmit, to the network node, UE capability information that indicates an SRS resource configuration for an NES state having a largest quantity of SRS antenna ports, wherein the SRS antenna sounding configuration used in the current time period is based at least in part on the UE capability information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a network node, information that indicates a periodic sequence of NES states, each NES state in the periodic sequence of NES states associated with an antenna configuration of the network node; and receiving, from the network node during a current time period, one or more downlink transmissions using a maximum quantity of MIMO layers associated with an active NES state for the current time period, the active NES state identified based at least in part on the periodic sequence of NES states.

Aspect 2: The method of Aspect 1, further comprising: receiving, from the network node, information that indicates the maximum quantity of MIMO layers for each NES state included in the periodic sequence of NES states in a respective NES configuration associated with the NES state; and identifying the maximum quantity of MIMO layers associated with the active NES state for the current time period based at least in part on the NES configuration associated with the active NES state for the current time period.

Aspect 3: The method of Aspect 1, further comprising: receiving, from the network node, information that indicates a mapping between quantities of antenna ports and values for the maximum quantity of MIMO layers; receiving, from the network node, information that indicates a quantity of antenna ports for each NES state included in the periodic sequence of NES states; and identifying the maximum quantity of MIMO layers associated with the active NES state for the current time period based at least in part on the quantity of antenna ports associated with the active NES state for the current time period.

Aspect 4: The method of any of Aspects 1-3, further comprising: identifying the maximum quantity of MIMO layers to use during the current time period from an NES configuration associated with the active NES state based at least in part on the periodic sequence of NES states being configured for an active bandwidth part associated with the current time period.

Aspect 5: The method of any of Aspects 1-3, further comprising: identifying the maximum quantity of MIMO layers to use during the current time period from an NES configuration associated with the active NES state based at least in part on the periodic sequence of NES states being configured for a cell.

Aspect 6: The method of any of Aspects 1-3, further comprising: identifying the maximum quantity of MIMO layers to use during the current time period from a bandwidth part configuration for the current time period based at least in part on the periodic sequence of NES states associating a normal mode with the current time period.

Aspect 7: The method of any of Aspects 1-3, further comprising: identifying the maximum quantity of MIMO layers to use during the current time period from a bandwidth part configuration for the current time period based at least in part on the periodic sequence of NES states not being configured for an active bandwidth part associated with the current time period.

Aspect 8: The method of any of Aspects 1-3, further comprising: identifying the maximum quantity of MIMO layers to use during the current time period from a bandwidth part configuration for the current time period based at least in part on the periodic sequence of NES states associating a flexible mode with the current time period.

Aspect 9: The method of any of Aspects 1-3, further comprising: identifying the maximum quantity of MIMO layers to use during the current time period from a cell configuration based at least in part on the periodic sequence of NES states associating a flexible mode with the current time period.

Aspect 10: A method of wireless communication performed by a user equipment (UE), comprising: receiving, from a network node, information that indicates a periodic sequence of NES states, each NES state in the periodic sequence of NES states associated with an antenna configuration of the network node; and transmitting, to the network node during a current time period, one or more SRS transmissions using an SRS antenna sounding configuration associated with an active NES state for the current time period, the active NES state identified based at least in part on the periodic sequence of NES states.

Aspect 11: The method of Aspect 10, further comprising: transmitting, to the network node, UE capability information that indicates an SRS resource configuration for an NES state having a largest quantity of SRS antenna ports, wherein the SRS antenna sounding configuration used in the current time period is based at least in part on the UE capability information.

Aspect 12: The method of Aspect 11, wherein the SRS antenna sounding configuration used in the current time period is the SRS resource configuration indicated in the UE capability information based at least in part on the active NES state for the current time period being the NES state having the largest quantity of SRS antenna ports.

Aspect 13: The method of any of Aspects 11-12, wherein the SRS antenna sounding configuration used in the current time period mutes one or more SRS resources relative to the SRS resource configuration indicated in the UE capability information based at least in part on the active NES state for the current time period being an NES state associated with fewer SRS antenna ports than the NES state having the largest quantity of SRS antenna ports.

Aspect 14: The method of any of Aspects 10-11, wherein the SRS antenna sounding configuration used in the current time period is mapped to a set of NES states that includes the active NES state for the current time period.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor communicatively coupled with the at least one memory, the at least one processor configured to cause the UE to:

receive, from a network node, information that indicates a periodic sequence of network energy saving (NES) states, each NES state in the periodic sequence of NES states associated with an antenna configuration of the network node, a first quantity of antenna ports indicated for a first NES state in the periodic sequence of NES states and a second NES state in the periodic sequence of NES states, and a second quantity of antenna ports indicated for a third NES state in the periodic sequence of NES states; and receive, from the network node during a current time period, one or more downlink transmissions using a maximum quantity of multiple input multiple output (MIMO) layers associated with an active NES state for the current time period, the active NES state identified based at least in part on the periodic sequence of NES states.

2. The UE of claim 1, wherein the at least one processor is further configured to cause the UE to:

receive, from the network node, in an NES configuration associated with the active NES state, information that indicates the maximum quantity of MIMO layers for each NES state included in the periodic sequence of NES states; and identify the maximum quantity of MIMO layers associated with the active NES state based at least in part on the NES configuration associated with the active NES state.

3. The UE of claim 1, wherein the at least one processor is further configured to cause the UE to:

receive, from the network node, information that indicates a mapping between quantities of antenna ports and values for the maximum quantity of MIMO layers;

receive, from the network node, information that indicates a quantity of antenna ports for each NES state included in the periodic sequence of NES states; and identify the maximum quantity of MIMO layers associated with the active NES state based at least in part on a quantity of antenna ports associated with the active NES state.

4. The UE of claim 1, wherein the at least one processor is further configured to cause the UE to:
identify the maximum quantity of MIMO layers to use during the current time period from an NES configuration associated with the active NES state based at least in part on the periodic sequence of NES states being configured for an active bandwidth part associated with the current time period.

5. The UE of claim 1, wherein the at least one processor is further configured to cause the UE to:
identify the maximum quantity of MIMO layers to use during the current time period from an NES configuration associated with the active NES state based at least in part on the periodic sequence of NES states being configured for a cell.

6. The UE of claim 1, wherein the at least one processor is further configured to cause the UE to:
identify the maximum quantity of MIMO layers to use during the current time period from a bandwidth part configuration for the current time period based at least in part on the periodic sequence of NES states associating a normal mode with the current time period.

7. The UE of claim 1, wherein the at least one processor is further configured to cause the UE to:
identify the maximum quantity of MIMO layers to use during the current time period from a bandwidth part configuration for the current time period based at least in part on the periodic sequence of NES states not being configured for an active bandwidth part associated with the current time period.

8. The UE of claim 1, wherein the at least one processor is further configured to cause the UE to:
identify the maximum quantity of MIMO layers to use during the current time period from a bandwidth part configuration for the current time period based at least in part on the periodic sequence of NES states associating a flexible mode with the current time period.

9. The UE of claim 1, wherein the at least one processor is further configured to cause the UE to:
identify the maximum quantity of MIMO layers to use during the current time period from a cell configuration based at least in part on the periodic sequence of NES states associating a flexible mode with the current time period.

10. A UE for wireless communication, comprising:
at least one memory; and
at least one processor communicatively coupled with the at least one memory, the at least one processor configured to cause the UE to:
receive, from a network node, information that indicates a periodic sequence of network energy saving (NES) states, each NES state in the periodic sequence of NES states associated with an antenna configuration of the network node, a first quantity of antenna ports indicated for a first NES state in the periodic sequence of NES states and a second NES state in the periodic sequence of NES states, and a second quantity of antenna ports indicated for a third NES state in the periodic sequence of NES states; and
transmit, to the network node during a current time period, one or more sounding reference signal (SRS) transmissions using an SRS antenna sounding configuration associated with an active NES state for the current time period, the active NES state identified based at least in part on the periodic sequence of NES states.

11. The UE of claim 10, wherein the at least one processor is further configured to cause the UE to:
transmit, to the network node, UE capability information that indicates an SRS resource configuration for an NES state having a largest quantity of SRS antenna ports, wherein the SRS antenna sounding configuration used in the current time period is based at least in part on the UE capability information.

12. The UE of claim 11, wherein the SRS antenna sounding configuration used in the current time period is the SRS resource configuration indicated in the UE capability information based at least in part on the active NES state being the NES state having the largest quantity of SRS antenna ports.

13. The UE of claim 11, wherein the SRS antenna sounding configuration used in the current time period mutes one or more SRS resources relative to the SRS resource configuration indicated in the UE capability information based at least in part on the active NES state being an NES state associated with fewer SRS antenna ports than the NES state having the largest quantity of SRS antenna ports.

14. The UE of claim 10, wherein the SRS antenna sounding configuration used in the current time period is mapped to a set of NES states that includes the active NES state.

15. A method of wireless communication performed by a user equipment (UE), comprising:
receiving, from a network node, information that indicates a periodic sequence of network energy saving (NES) states, each NES state in the periodic sequence of NES states associated with an antenna configuration of the network node, a first quantity of antenna ports indicated for a first NES state in the periodic sequence of NES states and a second NES state in the periodic sequence of NES states, and a second quantity of antenna ports indicated for a third NES state in the periodic sequence of NES states; and
receiving, from the network node during a current time period, one or more downlink transmissions using a maximum quantity of multiple input multiple output (MIMO) layers associated with an active NES state for the current time period, the active NES state identified based at least in part on the periodic sequence of NES states.

16. The method of claim 15, further comprising:
receiving, from the network node, in an NES configuration associated with the active NES state, information that indicates the maximum quantity of MIMO layers for each NES state included in the periodic sequence of NES states; and
identifying the maximum quantity of MIMO layers associated with the active NES state based at least in part on the NES configuration associated with the active NES state.

17. The method of claim 15, further comprising:
receiving, from the network node, information that indicates a mapping between quantities of antenna ports and values for the maximum quantity of MIMO layers;
receiving, from the network node, information that indicates a quantity of antenna ports for each NES state included in the periodic sequence of NES states; and identifying the maximum quantity of MIMO layers associated with the active NES state based at least in part on a quantity of antenna ports associated with the active NES state.

18. The method of claim 15, further comprising:
identifying the maximum quantity of MIMO layers to use during the current time period from an NES configuration associated with the active NES state based at least in part on the periodic sequence of NES states being configured for an active bandwidth part associated with the current time period.

19. The method of claim 15, further comprising:
identifying the maximum quantity of MIMO layers to use during the current time period from an NES configuration associated with the active NES state based at least in part on the periodic sequence of NES states being configured for a cell.

20. The method of claim 15, further comprising:
identifying the maximum quantity of MIMO layers to use during the current time period from a bandwidth part configuration for the current time period based at least in part on the periodic sequence of NES states associating a normal mode with the current time period.

21. The method of claim 15, further comprising:
identifying the maximum quantity of MIMO layers to use during the current time period from a bandwidth part configuration for the current time period based at least in part on the periodic sequence of NES states not being configured for an active bandwidth part associated with the current time period.

22. The method of claim 15, further comprising:
identifying the maximum quantity of MIMO layers to use during the current time period from a bandwidth part configuration for the current time period based at least in part on the periodic sequence of NES states associating a flexible mode with the current time period.

23. The method of claim 15, further comprising:
identifying the maximum quantity of MIMO layers to use during the current time period from a cell configuration based at least in part on the periodic sequence of NES states associating a flexible mode with the current time period.

24. A method of wireless communication performed by a user equipment (UE), comprising:
receiving, from a network node, information that indicates a periodic sequence of network energy saving (NES) states, each NES state in the periodic sequence of NES states associated with an antenna configuration of the network node, a first quantity of antenna ports indicated for a first NES state in the periodic sequence of NES states and a second NES state in the periodic sequence of NES states, and a second quantity of antenna ports indicated for a third NES state in the periodic sequence of NES states; and
transmitting, to the network node during a current time period, one or more sounding reference signal (SRS) transmissions using an SRS antenna sounding configuration associated with an active NES state for the current time period, the active NES state identified based at least in part on the periodic sequence of NES states.

25. The method of claim 24, further comprising:
transmitting, to the network node, UE capability information that indicates an SRS resource configuration for an NES state having a largest quantity of SRS antenna ports, wherein the SRS antenna sounding configuration used in the current time period is based at least in part on the UE capability information.

26. The method of claim 25, wherein the SRS antenna sounding configuration used in the current time period is the SRS resource configuration indicated in the UE capability information based at least in part on the active NES state being the NES state having the largest quantity of SRS antenna ports.

27. The method of claim 25, wherein the SRS antenna sounding configuration used in the current time period mutes one or more SRS resources relative to the SRS resource configuration indicated in the UE capability information based at least in part on the active NES state being an NES state associated with fewer SRS antenna ports than the NES state having the largest quantity of SRS antenna ports.

28. The method of claim 24, wherein the SRS antenna sounding configuration used in the current time period is mapped to a set of NES states that includes the active NES state.

* * * * *